United States Patent
Hedman

(10) Patent No.: US 11,441,493 B2
(45) Date of Patent: Sep. 13, 2022

(54) METHOD FOR PROVIDING VARIABLE COMPRESSION RATIO IN A COMBUSTION ENGINE AND DEVICE FOR THE METHOD

(71) Applicant: Hedman Ericsson Patent AB, Flen (SE)

(72) Inventor: Mats Hedman, Sparreholm (SE)

(73) Assignee: Hedman Ericsson Patent AB, Flen (SE)

( * ) Notice: Subject to any disclaimer, the term of this patent is extended or adjusted under 35 U.S.C. 154(b) by 0 days.

(21) Appl. No.: 17/425,241

(22) PCT Filed: Jan. 30, 2020

(86) PCT No.: PCT/SE2020/050075
§ 371 (c)(1),
(2) Date: Jul. 22, 2021

(87) PCT Pub. No.: WO2020/159425
PCT Pub. Date: Aug. 6, 2020

(65) Prior Publication Data
US 2022/0042467 A1 Feb. 10, 2022

(30) Foreign Application Priority Data
Feb. 1, 2019 (SE) .................................... 1930036-7

(51) Int. Cl.
*F02D 15/04* (2006.01)
*F02F 3/26* (2006.01)

(52) U.S. Cl.
CPC ............... *F02D 15/04* (2013.01); *F02F 3/26* (2013.01)

(58) Field of Classification Search
CPC .. F02D 15/00; F02D 15/04; F02F 3/26; F02F 3/0015; F02F 3/285; F02B 23/06;
(Continued)

(56) References Cited

U.S. PATENT DOCUMENTS

| 3,038,458 A | * | 6/1962 | Mansfield | ............. F02B 75/044 123/78 R |
| 7,637,241 B2 | * | 12/2009 | Styron | .................. F02B 75/044 123/193.6 |
| 2017/0130656 A1 | * | 5/2017 | Azevedo | ............... F02B 75/044 |

FOREIGN PATENT DOCUMENTS

| CN | 104405519 A | 3/2015 |
| CN | 104405520 A | 3/2015 |

(Continued)

OTHER PUBLICATIONS

International Search Report and Written Opinion regarding Appl. No. PCT/SE2020/050075, dated Apr. 30, 2020, 12 pps.

*Primary Examiner* — Grant Moubry
*Assistant Examiner* — James G Moubry
(74) *Attorney, Agent, or Firm* — Foley & Lardner LLP

(57) ABSTRACT

The present invention concerns a method for providing a variable compression ratio in a combustion engine, where the combustion chamber (9) is formed substantially by a piston bowl in the main piston (1), comprising a secondary piston (3) being displaceable against spring action between an upper/outer position which provides minimal volume of the combustion chamber (9) and a lower/inner position which provides maximum volume of the combustion chamber (9), or in a position therebetween depending on introduced air mass before the compression stroke. The method is characterized in arranging said secondary piston (3) resting on a spring (5) with substantially constant spring force adapted such that introduced air mass is to be compressed to a predetermined pressure at the end of the compression stroke. The invention also concerns a corresponding device and a diesel engine comprising such a device.

9 Claims, 3 Drawing Sheets

(58) Field of Classification Search
CPC .. F02B 23/0636; F02B 23/0639; F02B 23/02; F01B 31/14; F16J 1/00; F16J 1/005
See application file for complete search history.

(56) References Cited

FOREIGN PATENT DOCUMENTS

| | | |
|---|---|---|
| CN | 104454181 A | 3/2015 |
| DE | 10 2008 046 718 A1 | 4/2009 |
| JP | 04-353232 A | 12/1992 |
| JP | 10-205333 | 8/1998 |
| KR | 10-2008-0046976 A | 5/2008 |
| SE | 1500404 A1 | 4/2017 |

* cited by examiner

METHOD FOR PROVIDING VARIABLE COMPRESSION RATIO IN A COMBUSTION ENGINE AND DEVICE FOR THE METHOD

TECHNICAL FIELD

The invention relates to a method for providing variable compression ratio and a corresponding device with the object to increase efficiency in all types of piston combustion engines and furthermore to minimize formation of nitrogen oxides in diesel engines.

BACKGROUND

A problem to be solved in the diesel engines of today is to reduce the emissions of nitrogen oxides, so-called NOx. A proposed solution is described in Swedish patent 1500404-7 where the combustion chamber is disposed in the cylinder head and i.a. the possibility for variable compression ratio is a prerequisite. From the proposed solution, it can be read that size of the combustion chamber needs to be controllable with accuracy and then adapted to the air mass which in a preferred embodiment is introduced via freely controllable inlet valves. There are several proposed solutions concerning variable compression ratio, but as far as the inventor knows, it is not known that any of these involve a combustion chamber with variable size being disposed in the piston. By placing the size-wise variable combustion chamber in the piston, an efficiency increasing solution is provided for all types of piston combustion engines. For diesel engines, where a substantial part of the combustion chamber is normally formed as a bowl in the piston, the invention results in that the size of the bowl becomes variable.

SUMMARY

The object of the invention is to provide a solution for variable compression ratio in a diesel engine which meets the requirements regarding the possibility to vary the combustion chamber with accuracy and at the same time achieve a solution which in principle can be used in all types of piston combustion engines. This object is achieved by providing the invention with the characterizing features indicated in the patent claims formulated after the description.

An engine control system determines, based on for instance a position of a throttle pedal, several different actions, for instance how much air is to be introduced before the compression stroke, how much fuel is to be introduced and when it is to be introduced, and when the Swedish patent 1500404-7 is concerned also which size the combustion chamber is to be adjusted to in order to achieve optimal efficiency and a minimum of nitrogen oxides etc. The present invention is characterized in that the combustion chamber is provided in the piston and in that its size is automatically adjusted, and therefore differs from said Swedish patent.

Here the invention is described only by showing how adjustment and control of the size of the combustion chamber takes place after determining and signalling from the engine control system. A first basis for the adjustment of the combustion chamber size is the air volume which the engine control system has determined is to be introduced during the intake stroke.

The invention concerns a method and a device for providing a variable compression ratio in a combustion engine, where the combustion chamber is formed substantially by a piston bowl in the main piston, comprising a secondary piston being displaceable against spring action between an upper/outer position which provides minimal volume of the combustion chamber and a lower/inner position which provides maximum volume of the combustion chamber, or in a position therebetween depending on introduced air mass before the compression stroke. The secondary piston is arranged resting on a spring with substantially constant spring force adapted such that introduced air mass is to be compressed to a predetermined pressure (and temperature) at the end of the compression stroke. This predetermined pressure is substantially the same at two or more engine load points, preferably engine load points which correspond to said upper/outer position and said lower/inner position, and preferably also at all intermediate engine loads, and most preferably within the whole load range of the engine, i.e. from 0% to 100% load. The predetermined pressure may in embodiments be substantially the same regardless of engine load.

It is understood that constant spring force means that the spring has a spring force which is substantially, but not necessarily exactly, constant, but may be within for example +−5% or +−10%, at least within the range for its intended working length/extension, i.e. when the spring has an extension which corresponds to at most the corresponding upper/outer position to at least the corresponding lower/inner position. Preferably, the spring has a substantially constant spring force within the whole engine load range. In a corresponding manner, it is understood that substantially same pressure in the cylinder means that the pressure is substantially constant, but may vary somewhat, for example within +−10% between the two or more engine load points.

The invention also concerns a diesel engine comprising a device according to the invention.

In the combustion chamber, the bowl in the piston, the bottom of the bowl is formed by a movable secondary piston which can be moved upwards or downwards between an upper and a lower end position. The movement takes place passively during the compression stroke a distance depending on air mass introduced during the intake stroke.

When a minimum air mass is introduced, the bottom of the bowl is at its upper end position, and when a maximum air mass is introduced, the bottom of the bowl is at its lower end position at the end of the compression stroke.

The bottom of the bowl rests on a spring with constant spring force, for instance a mechanical spring, which basically means that introduced air mass, within the size-wise working range of the bowl, is always compressed to the same end pressure and temperature at the upper end position of the piston at which fuel is to be introduced in diesel engines. Outside the working range, end pressure and temperature may be smaller or greater depending on the introduced air mass.

If the bottom of the bowl, the movable secondary piston, is positioned above the lower end position when fuel is ignited, the piston bottom will, due to the pressure increase, move directly to its lower end position with immediate temperature reduction and reduced heat losses and assumed reduced NOx formation as a consequence. During the working stroke, the bottom of the bowl returns to the upper end position which means that the expansion rate is as if the bowl size could not be changed.

The method according to the invention may alternatively be described as a method for providing a variable compression rate in a combustion engine where the combustion chamber is formed substantially by a piston bowl in the main piston, comprising a secondary piston being displaceable against spring action between an upper/outer position which provides minimal volume of the combustion chamber and a lower/inner position which provides maximum volume of the combustion chamber, or in a position therebetween depending on introduced air mass before the compression stroke, wherein the size of the combustion chamber is adjusted and automatically adapted against the spring action during part load depending on introduced air mass.

The device according to the invention may alternatively be described as a device for providing a variable compression rate in a combustion engine and for performing the method according to the invention, wherein the combustion chamber is formed substantially by a piston bowl in the main piston, comprising a secondary piston being displaceable against spring action between an upper/outer position which provides minimal volume of the combustion chamber and a lower/inner position which provides maximum volume of the combustion chamber, or in a position therebetween depending on introduced air mass before the compression stroke, wherein said positions of the secondary piston are achieved depending on introduced air mass.

A further description is provided below with the aid of figures.

SHORT DESCRIPTION OF THE FIGURES

FIG. 1 schematically shows a cross-section through the piston of a diesel engine, or another type of piston engine, for instance an otto engine, where the size of the combustion chamber, the size of the piston bowl, is automatically adjusted for small air supply, and with the engine's piston in its upper end position after a compression stroke.

The figures show three examples with different sizes, small, medium and large size of the piston bowl, but any size therebetween may occur depending of how much air is supplied before compression commences.

All figures show the invention in principle. The presence of a connecting rod, piston rings and lubrication and obvious details which are not shown. The bottom and top edges of the piston bowl may be formed in different ways within the scope of the invention.

DETAILED DESCRIPTION

Figure 1:
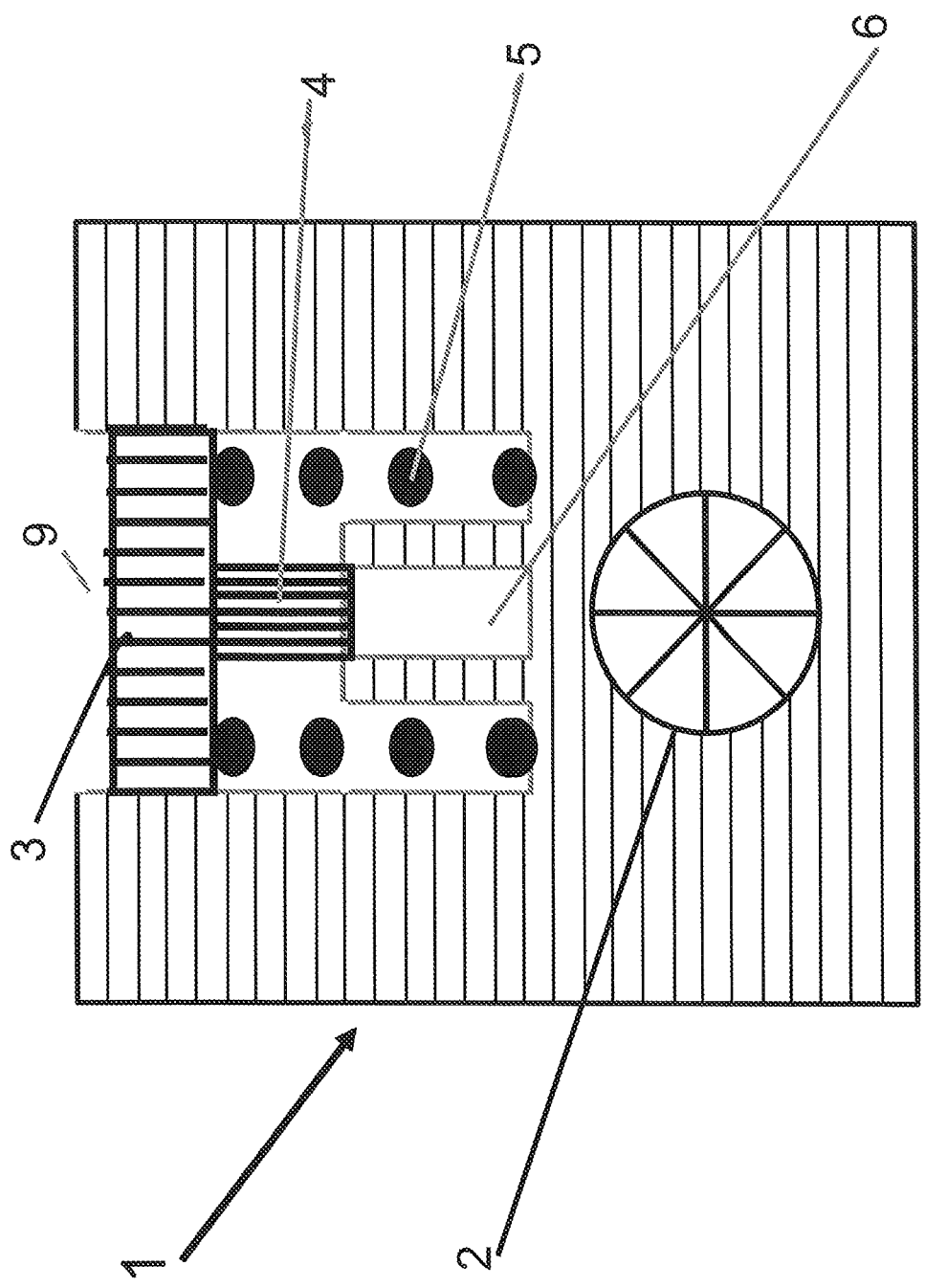

FIG. 1 shows the invention applied to a piston 1. In the piston 1, there is a conventional piston bolt 2. Further, a smaller piston 3 arranged in the piston 1 is shown, which smaller piston 3 is connected to a piston shaft 4 which runs in a chamber 6. The piston 3 rests on a mechanical spring 5 with constant spring force adapted to the pressure which is to prevail in the compression chamber 9 at the end of the compression stroke. The compression chamber is here minimal with the piston 3 in its upper position, i.e. a small mass of air has been introduced during the intake stroke.

Figure 2:
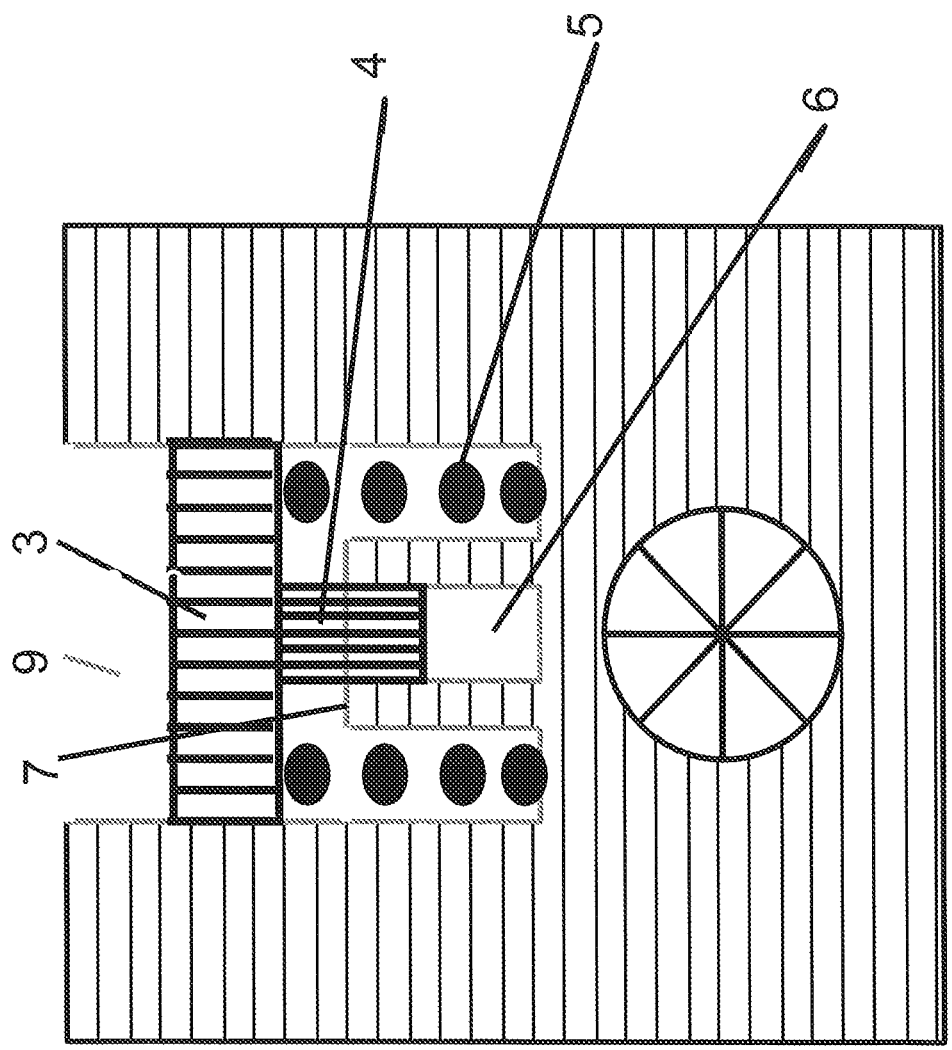
FIG. 2 shows schematically shows a cross-section through the piston of a diesel engine, or another type of piston engine, for instance an otto engine, where the size of the combustion chamber, the size of the piston bowl, is automatically adjusted for medium air supply, and with the engine's piston in its upper end position after a compression stroke.

FIG. 2 shows the piston 3 in a position in the compression chamber at the end of the compression stroke which results from introduction of a medium-large air mass. A mechanical stop 7 for the piston 3 is shown which is actualized according to FIG. 3.

Figure 3:
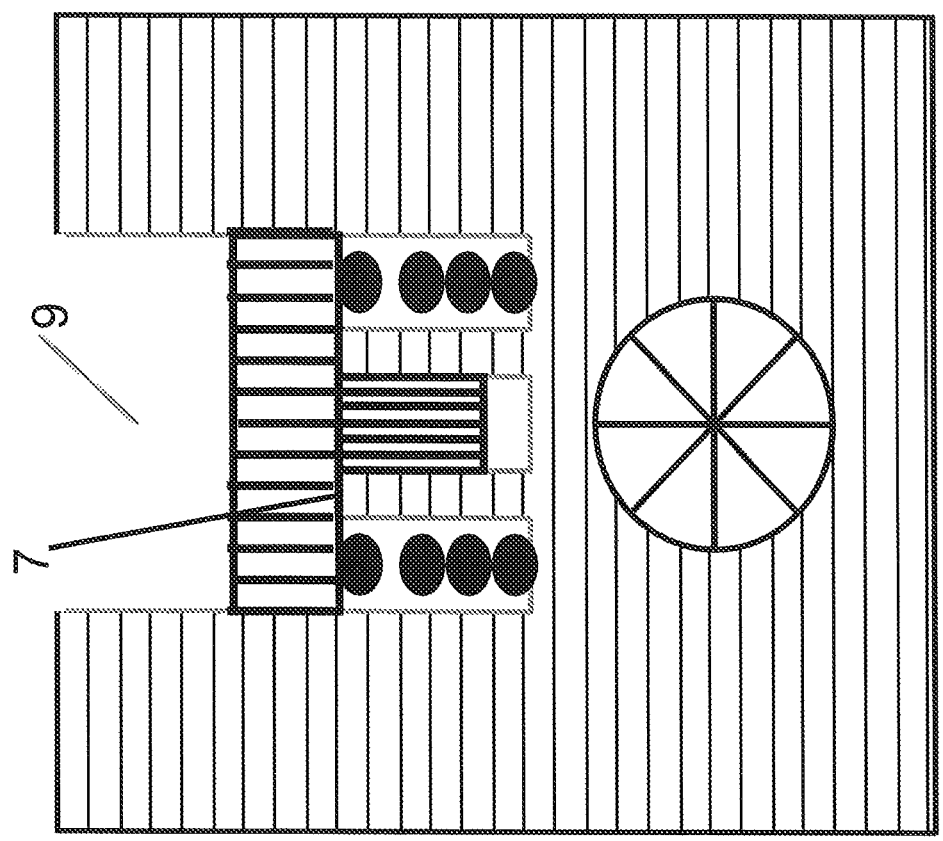
FIG. 3 shows schematically shows a cross-section through the piston of a diesel engine, or another type of piston engine, for instance an otto engine, where the size of the combustion chamber, the size of the piston bowl, is automatically adjusted for large air supply, and with the engine's piston in its upper end position after a compression stroke.

FIG. 3 shows the piston 3 in a position in the compression chamber at the end of the compression stroke which results from introduction of a maximum air mass. The piston 3 rests on a mechanical stop 7.

The invention is not limited to the embodiment mentioned and described above, but modifications may be made within the range of the following claims.

The invention claimed is:

1. A method for providing a variable compression ratio in a diesel engine comprising a combustion chamber formed substantially by a piston bowl in a main piston, the diesel engine comprising a secondary piston being displaceable against spring action between an upper/outer position which provides minimal volume of the combustion chamber and a lower/inner position which provides maximum volume of the combustion chamber, or in a position therebetween depending on introduced air mass before a compression stroke, wherein the method comprises:
arranging said secondary piston resting on a spring with substantially constant spring force adapted such that introduced air mass is compressed to a predetermined pressure at an end of the compression stroke, wherein the predetermined pressure is substantially equal when said secondary piston is in said upper/outer position and in said lower/inner position.

2. The method according to claim 1, wherein said spring force further is adapted such that the secondary piston is displaced to the lower/inner position during a working stroke when fuel is ignited.

3. The method according to claim 1, wherein the predetermined pressure is substantially equal when said secondary piston is in said upper/outer position and in said lower/inner position independent of engine load.

4. A device for providing a variable compression ratio in a diesel engine having a combustion chamber formed substantially by a piston bowl, the device comprising:
a secondary piston being displaceable against spring action between an upper/outer position which provides minimal volume of the combustion chamber and a lower/inner position which provides maximum volume of the combustion chamber, or in a position therebetween depending on introduced air mass before a compression stroke, and
a spring, wherein said secondary piston rests on the spring with substantially constant spring force adapted such that introduced air mass is compressed to a predetermined pressure at an end of a compression stroke, wherein the predetermined pressure is substantially equal when said secondary piston is in said upper/outer position and in said lower/inner position.

5. The device according to claim 4, wherein said spring force is further adapted such that the secondary piston is displaced to the lower/inner position during a working stroke when fuel is ignited.

6. The device according to claim 4, wherein the predetermined pressure is substantially equal when said secondary piston is in said upper/outer position and in said lower/inner position independent of engine load.

7. A diesel engine comprising:
a piston bowl;

a combustion chamber formed substantially by the piston bowl; and a device comprising:

a secondary piston being displaceable against spring action between an upper/outer position which provides minimal volume of the combustion chamber and a lower/inner position which provides maximum volume of the combustion chamber, or in a position therebetween depending on introduced air mass before a compression stroke, and a spring, wherein said secondary piston rests on the spring with substantially constant spring force adapted such that introduced air mass is compressed to a predetermined pressure at an end of a compression stroke, wherein the predetermined pressure is substantially equal when said secondary piston is in said upper/outer position and in said lower/inner position.

8. The diesel engine of claim 7, wherein said spring force is further adapted such that the secondary piston is displaced to the lower/inner position during a working stroke when fuel is ignited in the combustion chamber.

9. The diesel engine according to claim 7, wherein the predetermined pressure is substantially when said secondary piston is in said upper/outer position and in said lower/inner position equal independent of engine load.

\* \* \* \* \*